(12) United States Patent
Guzelgunler

(10) Patent No.: US 8,975,845 B2
(45) Date of Patent: Mar. 10, 2015

(54) MOTOR OPERATION FAILURE DETECTION

(75) Inventor: Yilcan Guzelgunler, Tipp City, OH (US)

(73) Assignee: Regal Beloit America, Inc., Beloit, WI (US)

( * ) Notice: Subject to any disclaimer, the term of this patent is extended or adjusted under 35 U.S.C. 154(b) by 553 days.

(21) Appl. No.: 13/285,907

(22) Filed: Oct. 31, 2011

(65) Prior Publication Data

US 2013/0106331 A1    May 2, 2013

(51) Int. Cl.
| | |
|---|---|
| H02H 7/09 | (2006.01) |
| H02P 25/02 | (2006.01) |
| H02P 29/02 | (2006.01) |
| H02P 1/46 | (2006.01) |

(52) U.S. Cl.
CPC .............. *H02P 25/021* (2013.01); *H02P 29/02* (2013.01); *H02P 1/46* (2013.01)
USPC ....................................... 318/400.22; 318/461

(58) Field of Classification Search
USPC ............. 318/432, 434, 461, 400.22, 798, 799
See application file for complete search history.

(56) References Cited

U.S. PATENT DOCUMENTS

| | | | |
|---|---|---|---|
| 5,076,761 A * | 12/1991 | Krohn et al. ..................... 417/18 |
| 6,011,368 A | 1/2000 | Kalpathi et al. | |
| 6,254,353 B1 * | 7/2001 | Polo et al. ..................... 417/44.11 |
| 7,042,180 B2 * | 5/2006 | Terry et al. ............... 318/400.21 |
| 7,064,526 B2 | 6/2006 | Patterson | |
| 7,106,019 B2 * | 9/2006 | Becerra et al. ........... 318/400.01 |
| 7,319,300 B2 * | 1/2008 | Hahn ....................... 318/400.32 |
| 7,426,099 B2 | 9/2008 | Soudier et al. | |
| 7,572,108 B2 * | 8/2009 | Koehl ............................. 417/53 |
| 7,612,510 B2 * | 11/2009 | Koehl ...................... 318/400.21 |
| 8,004,226 B2 | 8/2011 | Hartman et al. | |
| 2006/0127227 A1 * | 6/2006 | Mehlhorn et al. .............. 417/53 |
| 2006/0193090 A1 | 8/2006 | Ho | |
| 2008/0144341 A1 * | 6/2008 | Cook .............................. 363/53 |
| 2009/0211822 A1 | 8/2009 | Gears | |
| 2010/0090631 A1 | 4/2010 | Yang et al. | |
| 2010/0181952 A1 | 7/2010 | Cheng | |
| 2011/0050155 A1 | 3/2011 | Balcon et al. | |

FOREIGN PATENT DOCUMENTS

| | | |
|---|---|---|
| JP | 2010074883 | 4/2010 |
| KR | 20070076854 | 7/2007 |

\* cited by examiner

*Primary Examiner* — Rina Duda
(74) *Attorney, Agent, or Firm* — Michael Best & Friedrich LLP

(57) ABSTRACT

Systems and methods of detecting a failure of a permanent magnet synchronous motor system. A current of each phase coil of the motor is monitored. A value indicative of the power of the motor is compared to a threshold value indicative of power during a low power detection period. If the value indicative of the power fails to exceed the threshold value indicative of power for the entire low-power detection period, the system indicates a first error condition. The method also monitors the speed of the motor and indicates a second error condition if the speed of the motor remains below a speed threshold for an entire speed failure detection period. A third error condition is indicated if the current of at least one phase of the motor remains below a phase current threshold for an entire loss of phase detection period.

11 Claims, 3 Drawing Sheets

MOTOR OPERATION FAILURE DETECTION

BACKGROUND

The present invention relates to control systems for permanent magnet synchronous motors. In particular, the present invention relates to detecting error conditions during start-up and operation of a permanent magnet synchronous motor for water pump systems.

SUMMARY

In one embodiment, the invention provides a method of detecting a failure of a permanent magnet synchronous motor system. The method includes monitoring a current of each phase of the motor. A value indicative of the power of the motor is compared to a threshold value indicative of power during a low power detection period. If the value indicative of the power fails to exceed the threshold value indicative of power for the entire low-power detection period, the system indicates a first error condition. The method also monitors the speed of the motor and indicates a second error condition if the speed of the motor remains below a speed threshold for an entire speed failure detection period. A third error condition is indicated if the current of at least one phase of the motor remains below a phase current threshold for an entire loss of phase detection period.

In another embodiment the invention provides a failure detection system for a permanent magnet motor. The system includes a controller. In some embodiments, the controller includes a processor and a computer-readable memory storing instructions to be executed by the processor during operation of the motor. The controller is configured to monitor a current of each phase of the motor and compare a value indicative of the power of the motor to a threshold value indicative of power. If the value indicative of the power fails to exceed the threshold value indicative of power for the entire low-power detection period, the system indicates a first error condition. The method also monitors the speed of the motor and indicates a second error condition if the speed of the motor remains below a speed threshold for an entire speed failure detection period. A third error condition is indicated if the current of at least one phase of the motor remains below a phase current threshold for an entire loss of phase detection period.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Permanent magnet synchronous motor systems operate by applying a sinusoidal current through each of the three phase coils of the motor. The sinusoidal current is phase shifted on each phase coil such that a permanent magnet rotor is attracted or repelled by each phase of the motor. The speed of the motor is adjusted by changing the frequency of the sinusoidal current on each phase coil. However, a proper start-up routine is necessary to achieve successful operation of the motor. Failure of the system to achieve synchronization or proper power levels will prevent the motor from operating as intended. Some electric motor systems include a position sensor to detect the position of the permanent magnet rotor and to control operation of the motor accordingly. However, including a position sensor increases the cost of the motor system.

Start-up failure can manifest itself in various ways. The most common causes of such failures include a failure of a connection between an inverter/power source and a motor phase coil, failure of the magnet rotor, electronics failures, and motor/load related failures. The failure detection system described below implements three concurrent failure detection schemes that provide comprehensive detection of motor failures during a start-up routine.

Figure 1:
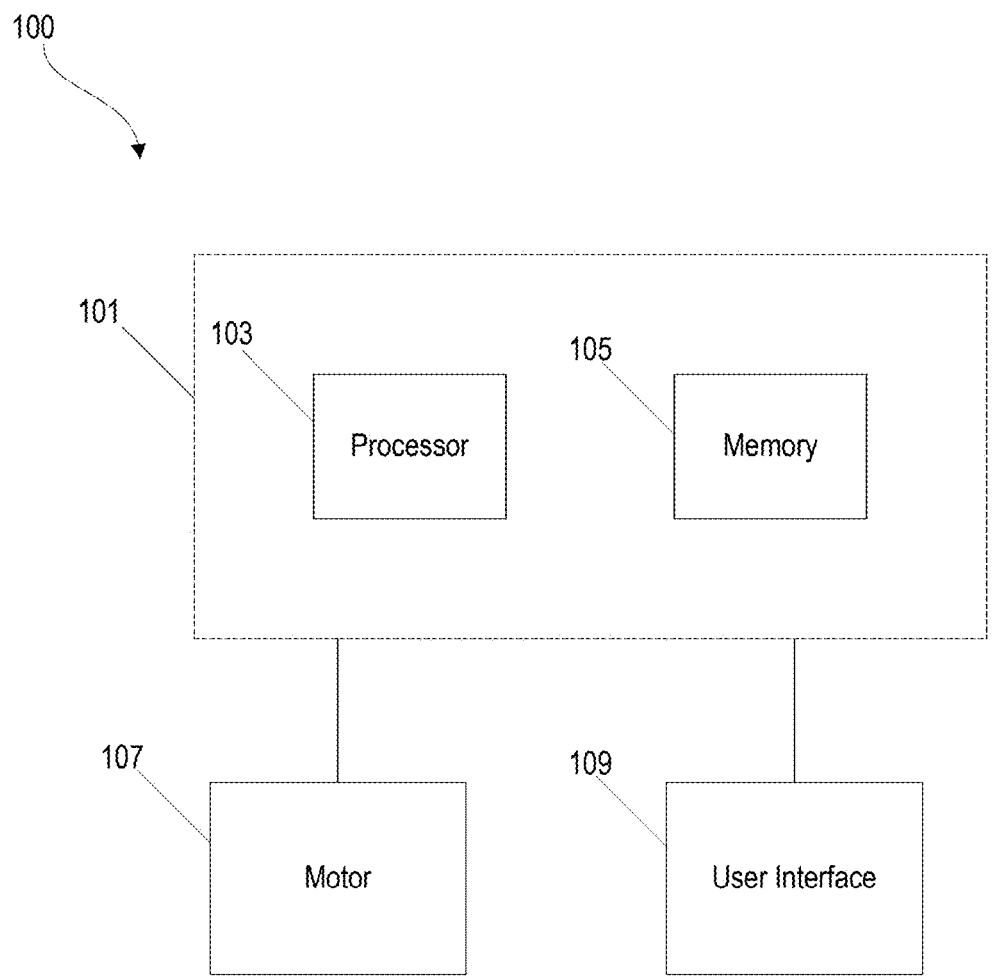
FIG. 1 is a block diagram of a motor system including a motor failure detection system.

FIG. 1 illustrates a failure detection system for a motor system, such as a water pump for pools and spas. The system 100 does not include a Hall-effect sensor to detect the position of the permanent magnet rotor. The system 100 includes a controller 101. The controller 101 in this example includes a processor 103 and a memory 105 storing instructions that are executed by the processor 103 to control the operation of the system 100. However, in other embodiments, the controller 101 can be implemented using other technology such as, for example, an application specific integrated circuit (ASIC). The controller 101 operates an electric motor 107 and monitors certain performance characteristics of the motor 107. The motor 107 includes a permanent magnet rotor positioned within a stator with three phase coils. The controller 101 also receives signals from a user interface 109 and provides an output to the user interface 109.

In addition to controlling the normal operation of the motor 107, the controller 101 also implements a start-up routine to ensure proper operation of the motor 107. The controller 101 also monitors performance characteristics of the motor during the start-up routine to ensure that the motor 107 achieves proper operation. In particular, the control 101 performs three specific error detection routines to ensure that the motor 107 achieves proper power levels, does not stall or lose synchronization, and maintains all the three phase connections.

Figure 2:
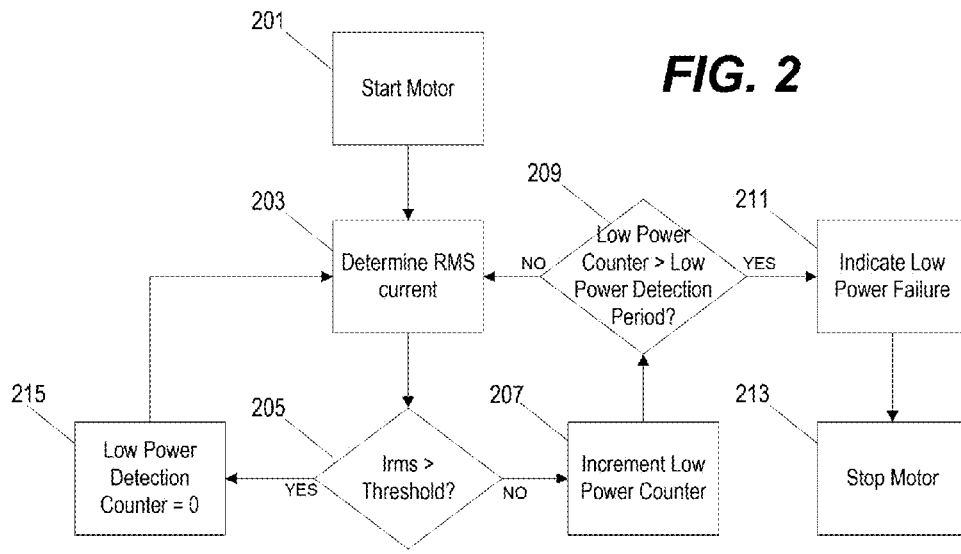
FIG. 2 is a flow-chart of a method of detecting a low-power failure in the motor system of FIG. 1.

FIG. 2 illustrates a method by which the controller 101 monitors the operation of the motor to ensure that proper power levels are provided. When the motor 107 is powered with a load and is running properly, the input current to the motor will not drop below a minimum current level after an initial delay period. If the current fails to achieve a minimum level during start-up or drops below the minimum level after exceeding it, the motor is not operating properly. Furthermore, the motor may also not be operating properly if the input current drops below the minimum current level during normal operation.

To detect a low power error condition, the controller 101 begins by starting the motor and applying an alternating current to each phase coil (step 201). The controller 101 then determines an input current ($I_{rms}$) of the motor (step 203). The $I_{rms}$ current value is indicative of the power of the motor and is calculated using the following formula: $I_{rms}=\sqrt{(i_q^2+i_d^2)}/\sqrt{3}$. $I_{rms}$ is then compared to a threshold value (step 205). In various embodiments, the threshold value indicative of power value is set at the time of manufacture or tuned based on the pump system. The threshold value indicative of power can also be calculated during operation of the motor based on observed performance characteristics of the pumps system. If the $I_{rms}$ value does not exceed the threshold, a counter is incremented (step 207). If the $I_{rms}$ value remains below the threshold for a "low power detection period (step 209), then the controller 101 indicates that a low power failure has been detected (step 211). When a failure condition is detected, the controller 101 stops the motor (step 213) or takes other remedial action to address the failure. In some systems, the controller 101 will then attempt to start the motor again or disabled the motor until it has been repaired.

If, however, the $I_{rms}$ value exceeds the threshold before the end of the low power detection period, the controller 101 determines that the motor is operating properly and resets the low power detection counter (step 215). In the method illustrated in FIG. 2, the controller 101 continues to monitor the $I_{rms}$ value (step 203) even after the start-up routine to ensure proper operation during the normal operating cycle of the motor system. In other systems, the controller 101 only monitors the $I_{rms}$ value during the start-up routine of the motor. Such systems stop comparing the $I_{rms}$ value to the current threshold after the expiration of a start-up time period or after the $I_{rms}$ value exceeds the threshold value indicative of power for the first time. In still other systems, after the $I_{rms}$ value exceeds the threshold value indicative of power, the controller 101 indicates an error condition any time the $I_{rms}$ value drops below the threshold.

Figure 3:
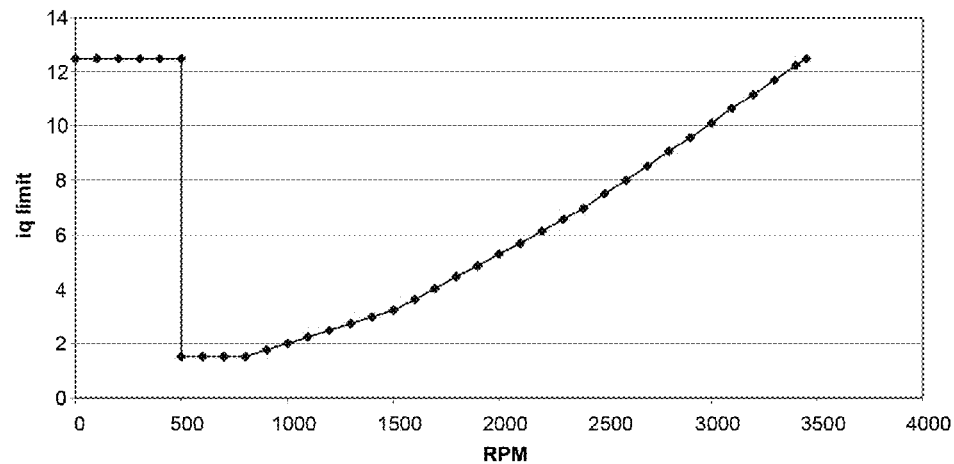
FIG. 3 is a graph of a current limit profile based on motor speed.

The second error condition monitored by the controller 101 is motor stalling or loss of synchronization. As noted above, the controller 101 operates the motor 107 differently during the start-up mode to ensure that proper operation of the motor is obtained. One particular difference is that the controller 101 of some motor systems operates the motor according to an open-loop control routine during the start-up mode and switches to a closed loop vector-based control routine during normal operation. In such systems, the maximum current provided to the phase coils of the motor (i.e., the current limit) is determined differently depending on the speed of the motor. As illustrated in FIG. 3, during start-up mode, a maximum current limit is applied to the motor to increase the chance of achieving a speed at which the controller 101 switches to the closed loop, vector-based control routine—illustrated in FIG. 3 as 500 RPM. Once the switch-over speed is achieved, the maximum current is determined as a function of motor speed as defined by a current limit profile.

In FIG. 3, the current limit is set at 12.5 A until the switch-over speed of 500 RPM is achieved, at which point the current limit decreases from 12.5 A to 1.5 A. As the motor speed increases beyond 500 RPM, the current limit is also increased until it again reaches 12.5 A at approximately 3450 RPM. If the motor is unable to achieve the minimum operating speed by the end of the start-up routine, the controller 101 will not be able to operate the motor according to the closed-loop vector-based control routine. Similarly, the motor speed should not fall below a minimum operating speed once the minimum operating speed has been achieved. Failure to achieve or maintain the minimum operating speed indicates a stall or synchronization failure of the motor system.

Figure 4:
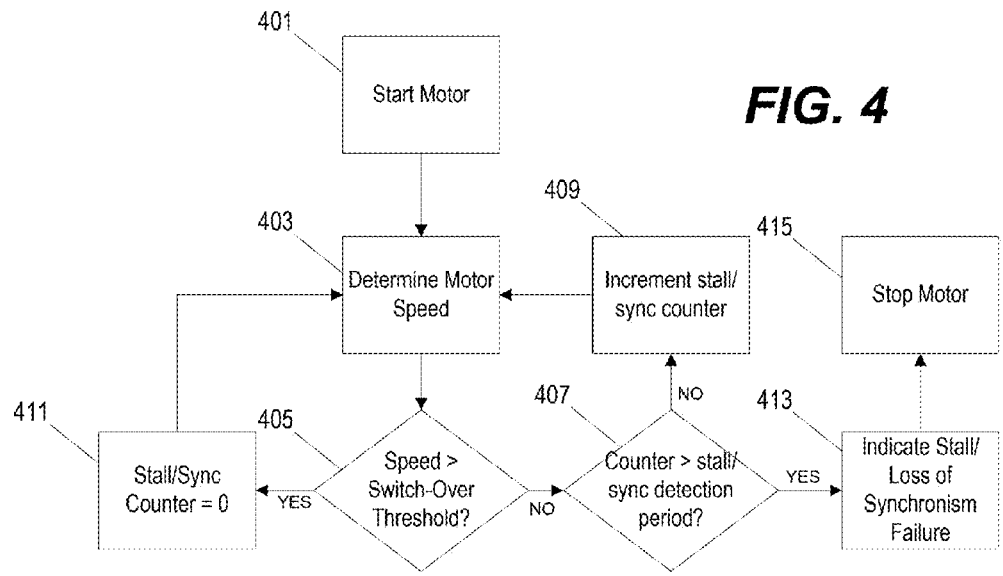
FIG. 4 is a flow-chart of a method of detecting a stall or loss of motor synchronization in the motor system of FIG. 1.

FIG. 4 illustrates a method of detecting a stall or synchronization failure of the motor system based on monitoring the speed of the motor. The controller 101 estimates the speed of the based in part on an estimation of current error. As such, limiting current based on a current limit profile as function of speed (such as the one illustrated in FIG. 3) also limits the current estimation error and ensures that motor stalls/loss of synchronism can be detected at speeds below the open loop-to-vector switch over speed.

The controller 101 starts the motor (step 401) and controls the motor according to an open-loop control routine. The controller 101 determines the speed of the motor (step 403) and compares the speed to a switch-over threshold (step 405). If the speed does not exceed the switch-over threshold, the controller 101 checks to determine if a stall/sync detection period has expired (step 407). This is monitored by incrementing a counter (step 409) each time the speed is less than the switch-over threshold. When the speed of the motor reaches the switch-over threshold, the controller 101 switches to the closed-loop vector-based control routine and resets the stall/sync counter (step 411). However, if the speed of the motor fails to reach the switch-over threshold before the end of the stall/sync period (step 407), the controller 101 indicates a stall or loss of synchronization failure (step 413) and stops the motor (step 415) or takes other remedial action to address the failure.

In the method illustrated in FIG. 4, the controller 101 continues to monitor the motor for stall or loss of synchronization failures even after the start-up routine is concluded. By resetting the counter when a minimum operating speed or the switch-over speed is exceeded, the controller 101 is able to determine if the speed of motor subsequently drops below the speed threshold and remains there for the stall/sync detection period. If such a stall or loss of synchronization is detected during normal operation of the motor, the controller 101 will again indicate a failure condition (step 413) and stop the motor (step 415).

In other systems, the controller 101 may stop monitoring the speed of the motor for loss of synchronization failures after the expiration of the start-up period. In such systems, the controller 101 may stop comparing the motor speed to the threshold after the speed exceeds the threshold for the first time. Alternatively, such controller may continue to monitor the speed comparison to detect if the motor speed drops below the speed threshold again only during the start-up time period. Furthermore, as noted above, the motor speed should remain above the threshold once the minimum operating speed is achieved. As such, after the minimum operating speed threshold has been exceeded, some motor systems will indicate an error any time that the motor speed drops below the minimum speed threshold.

The third error condition monitored by the controller 101 is a loss of phase. As noted above, the permanent magnet motor used in the system 100 includes three phase coils. A sinusoidal current is applied to each of the three phase coils. The speed of rotation is controlled by the frequency of the sinusoidal current applied to each phase coil. Under this control scheme, the current of a single phase coil will alternate between a positive current and a negative current of equal magnitude. If power to any single phase of the motor is lost, the motor may not operate properly. As such, the controller 101 monitors the current of each individual phase coil to ensure that all of the phase coils remain operational.

Figure 5:
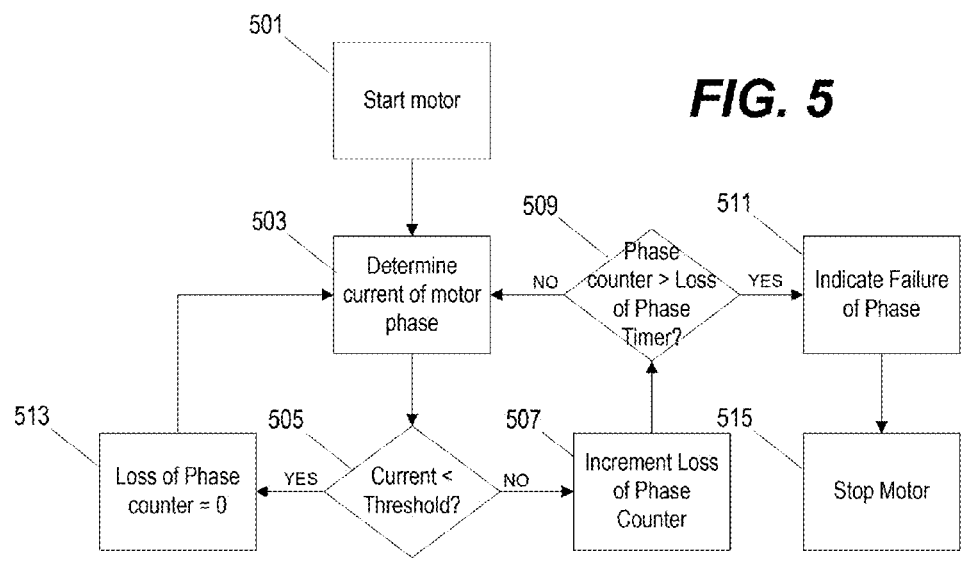
FIG. 5 is a flow-chart of a method of detecting a failure of a motor to establish proper phase in the motor system of FIG. 1.

FIG. 5 illustrates a method of monitoring for a loss of phase during the start-up routine of the motor. The controller 101 starts the motor (step 501) and determines the current of one specific phase of the motor (step 503). The absolute value, or magnitude, of the instantaneous current of the phase coil is compared to a threshold (step 505). The threshold is defined as a current level less than the RMS current applied to the motor. In this specific example, the threshold is defined as a percentage of the $I_{rms}$ value of the system below 100%. The phase current threshold value is updated continuously throughout operation of the system. If the instantaneous current of the single phase does not exceed the phase current threshold a loss of phase counter is incremented (step 507). If the loss of phase counter exceeds a loss of phase time period (step 509), the controller 101 determines that the phase coil is not operating properly and indicates a phase error (step 511). If, however, the controller 101 determines that the instantaneous current applied to the phase exceeds the threshold (step 505), the controller 101 determines that power has been applied to the phase coil properly and resets the loss of phase counter (step 513). If a failure condition is detected, the controller 101 stops the motor (step 515) or takes other remedial action to address the failure.

The method of FIG. 5 is performed for each individual phase to verify that all three phase coils are being powered properly. Furthermore, the method of FIG. 5 continues to monitor the absolute current value of each phase coil compared to phase current threshold during normal operation of the motor. If the absolute current value of any phase coil drops below the threshold and remains below the threshold for the duration of the loss of phase timer, then the controller 101 will indicate a failure of the phase coil.

The three failure detection schemes described above are operated concurrently during the operation of the motor to detect failure conditions. However, in some implementations, the controller 101 will repeatedly perform the three failure detection routines serially. The manner in which the motor controller 101 responds to a detected failure condition varies depending upon the system implementing the failure detection system described above. As noted above, in some systems, the motor is stopped when a failure condition is detected. However, other systems may take other remedial action to address the detected failure condition. Furthermore, in some systems, the controller 101 provides a visual or auditory output through the user interface 109 indicating that a failure condition has been detected during start-up.

As also described above, each of the three failure detection schemes can be modified to detect failure conditions only during a start-up mode or at all times during operation of the motor system. For example, some systems may apply all three failure detection schemes during the start-up routine, but only continue to monitor one or two of the failure detection schemes during normal operation of the motor system.

Lastly, the three failure detection schemes described above refer to time periods such as a low-power detection period, a stall/sync period, and a loss of phase period. These time periods can be the same duration or different durations depending upon the specific implementation of the failure detection schemes. For example, the same time period can be implemented to monitor for low-power failures (e.g., FIG. 2) and loss of phase failures (e.g., FIG. 5) while a shorter time period is used to determine whether the motor has achieved and maintained the minimum operating speed (e.g., FIG. 4).

Thus, the invention provides, among other things, a comprehensive failure detection system for a permanent magnet motor system such as a fluid pump. The system applies three different failure detection schemes during start-up of the motor system to ensure proper operation has been achieved. In some embodiments, the failure detection schemes are also applied during normal operation to ensure that proper operation of the motor continues after the start-up routine is concluded. Various features and advantages of the invention are set forth in the following claims.

What is claimed is:

1. A method of detecting a failure of a permanent magnet motor system comprising:
   monitoring a current of each phase of the permanent magnet motor system;
   repeatedly comparing a value indicative of power of the permanent magnet motor system to a threshold value indicative of power for a low power detection period;
   indicating a first error condition when the value indicative of power remains below the threshold value indicative of power for an entire low power detection period;
   estimating a current error;
   monitoring a speed of the permanent magnet motor system based in part on the current error;
   repeatedly comparing the speed of the permanent magnet motor system to a speed threshold for a speed failure detection period;
   indicating a second error condition when the speed of the permanent magnet motor system remains below the speed threshold for an entire speed failure detection period;
   repeatedly comparing the current of each phase of the permanent magnet motor system to a phase current threshold for a loss of phase detection period; and
   indicating a third error condition when the current of at least one phase of the permanent magnet motor system remains below the phase current threshold for an entire loss of phase detection period.

2. The method of claim 1, wherein the value indicative of the power of the permanent magnet motor system includes the root-mean-squared value of an input current to the permanent magnet motor system.

3. The method of claim 1, further comprising the acts of indicating the first error condition if the value indicative of the power of the permanent magnet motor system falls below the threshold value indicative of power after the value indicative of the power of the permanent magnet motor system exceeds the threshold value indicative of power.

4. The method of claim 1, wherein the act of indicating a first error condition when the value indicative of the power does not exceed the current threshold during a low power detection period includes indicating the first error condition when the value indicative of power falls below the threshold value indicative of power for the low power detection period after exceeding the threshold value indicative of power.

5. The method of claim 1, wherein the first error condition, the second error condition, and the third error condition are indicated only during a motor start-up period.

6. The method of claim 1, further comprising the acts of:
   operating the permanent magnet motor system based on a first maximum current limit until the speed of the permanent magnet motor system exceeds the speed threshold; and
   continuously determining a subsequent maximum current limit based at least in part on the speed of the permanent magnet motor system after the speed of the permanent magnet motor system has exceeded the speed threshold.

7. The method of claim 6, further comprising indicating the second error condition when the speed of the permanent magnet motor system drops below the speed threshold after previously exceeding the speed threshold.

8. The method of claim 1, wherein the acts of indicating the first error condition, indicating the second error condition, and indicating the third error condition include activating an indicator alerting a user of the permanent magnet motor system.

9. The method of claim 1, wherein the act of indicating the first error condition, indicating the second error condition, and indicating the third error condition include generating a signal.

10. The method of claim 9, further comprising automatically stopping operation of the permanent magnet motor system in response to the generated signal.

11. The method of claim 1, wherein the act of repeatedly comparing the current of each phase of the permanent magnet motor system to a phase current threshold for a loss of phase detection period includes repeatedly comparing an absolute value of the current of each phase of the permanent magnet motor system to the phase current threshold for the loss of phase detection period, and wherein the act of indicating a third error condition when the current of at least one phase of the permanent magnet motor system remains below the phase current threshold for the entire loss of phase detection period includes indicating the third error condition when the absolute value of the current of at least one phase of the permanent magnet motor system remains below the phase current threshold for the entire loss of phase detection period.

* * * * *